Nov. 13, 1962 J. E. McAULEY 3,063,937
WATER SOFTENING SYSTEM
Filed April 5, 1956 2 Sheets-Sheet 1
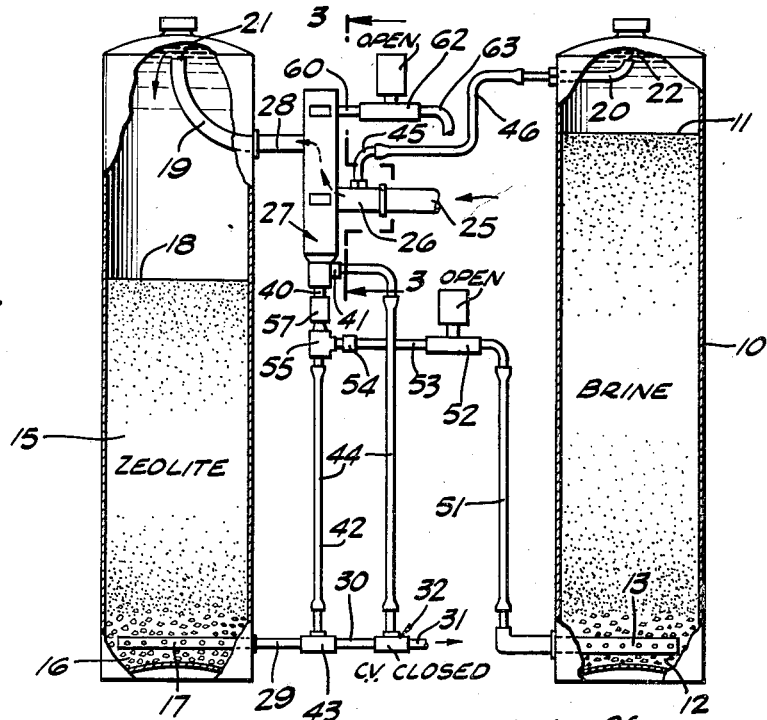
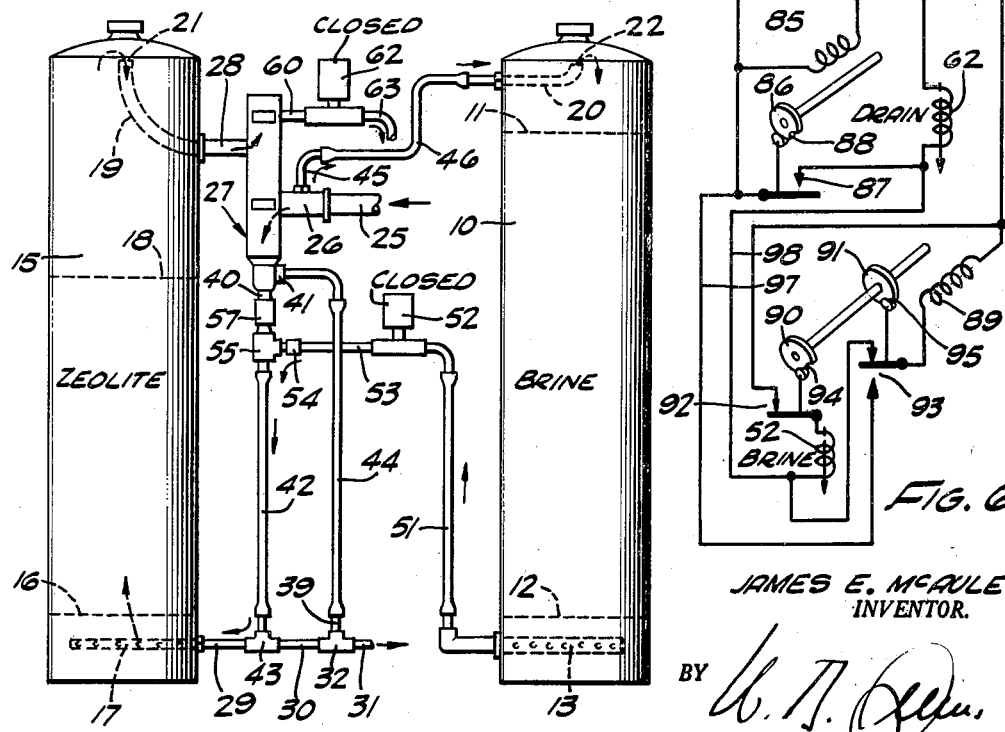
JAMES E. McAULEY
INVENTOR.
BY
ATTORNEY Nov. 13, 1962  J. E. McAULEY  3,063,937
WATER SOFTENING SYSTEM
Filed April 5, 1956
2 Sheets-Sheet 2

JAMES E. McAULEY
INVENTOR.

ATTORNEY

United States Patent Office 3,063,937
Patented Nov. 13, 1962

3,063,937
WATER SOFTENING SYSTEM
James E. McAuley, Compton, Calif., assignor to William Douglas Sellers, Pasadena, Calif.
Filed Apr. 5, 1956, Ser. No. 576,424
3 Claims. (Cl. 210—35)

This invention relates to the treatment of water to remove impurities therefrom and more particularly to a novel and improved water softening system and method especially suitable for use in residences for providing a substantially continuous supply of soft water from a pressurized source of hard water.

Numerous systems have been devised heretofore for this purpose but are noteworthy for their complexity, multiplicity of circuits and valves and either periodic manipulation to initiate re-cycling of the regenerative phase of operation or close supervision of automatic devices for doing so. In contrast, the present invention provides a closed system operating at customary water supply pressures and having a greatly simplified circuit controlled by a minimum of conventional valves in combination with a simplified automatic valve of novel design responsive to a pressure change to initiate the reconditioning cycle of the softening agent.

Prior systems have relied upon injectors energized by the supply line pressure for circulating a stream of brine through the chemical softening agent to regenerate it. But this mode of conveying the brine through the agent is subject to the undesirably low limitations on both the concentration and duration of flow of the brine inherent in the use of injectors, with the result that an excessive period is required for reconditioning the agent in a less efficient manner.

By the present invention, however, these disadvantages are completely overcome by the use of properly proportioned and strategically located metered orifices in lieu of the injector and selected to give any desired flow as regards both quantity and rate. Accordingly, I find it is easily possible to provide a flow of brine through the chemical agent having a concentration several times greater than is possible when using the heretofore universal injector method, and to bring the required charge of brine into intimate contact with the softening agent in a more effective as well as a much shorter period of time.

Another feature of the invention is a fluid circuit arrangement making use of flow restrictors and a check valve in such manner that sweet water uncontaminated with brine can be withdrawn from the usual faucets at any time, including periods when brine is flowing through a portion of the conduit normally used to distribute water to the faucets.

Yet another feature is the provision of a closed water softening system free of screens, grilles or other similar devices between the softening agent and the drain pipe used in flushing the agent of brine.

A further object is the provision of a pressure-operated valve responsive to a pressure differential of as little as 5 p.s.i. between two points following opening of the brine drain valve to automatically reverse the flow of water through the chemical agent and to initiate a flow of water in a normally quiescent circuit to propel a concentrated stream of brine through the agent as well as for restoring the normal circuit promptly and as a result of the closing of the brine drain.

Still a further object is the provision of a control system for initiating the regenerative cycle at predetermined periods in excess of twenty-four hours including a separate timer for accurately measuring short brine flow intervals of eight to twelve minutes, flushing water flow of forty-five to sixty minutes and thereafter terminating the regenerative cycle and restoring the system to normal water softening operation.

Numerous other objects and advantages of the invention will become apparent from the following detailed description of an illustrative embodiment taken in connection with the accompanying drawings, wherein:

FIGURE 1 is an elevational view of the invention with parts broken away for clarity and showing the normal path of circulation of water being treated for hardness;

FIGURE 2 is a similar view but differing in showing the direction and mode of circulation during the initial stage of the regenerative cycle;

FIGURE 6 is a schematic wiring diagram for the automatic control mechanism.

Figure 3:
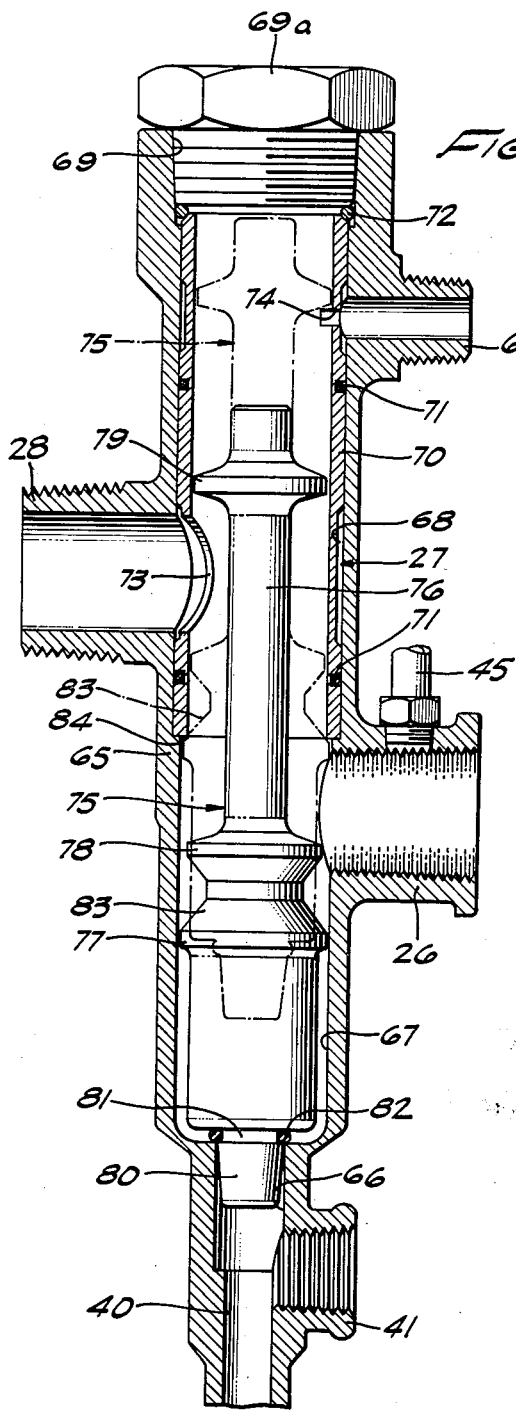
FIGURE 3 is a vertical sectional view taken along line 3—3 on FIGURE 1 and showing the position of the automatic pressure-responsive valve during normal service conditions.
Figure 4:
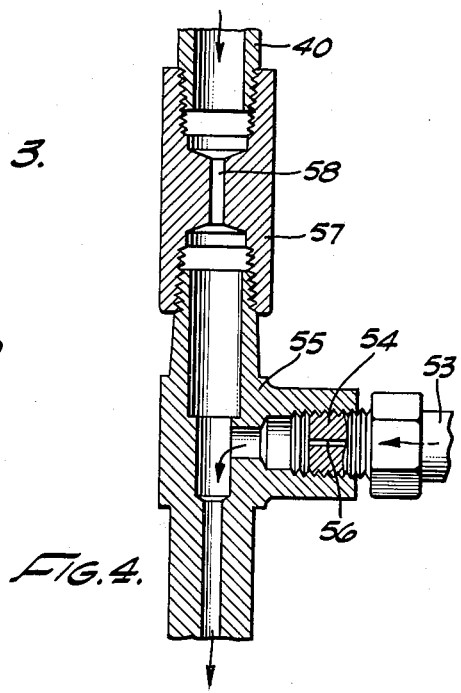
FIGURE 4 is a fragmentary vertical sectional view through the two restrictor devices forming an important feature of the invention.

Referring now to the drawings and more particularly to FIGURE 1, it will be seen that the system comprises two principal upright tanks interconnected by pipes and control valves. Right-hand tank 10 is initially charged to an initial level 11 with a saturated brine solution bottomed upon a filtering layer of gravel 12 to a point slightly above the perforated outlet conduit 13. A second elongated tank 15 of substantially the same size and capacity has a layer of gravel 16 surrounding a perforated water ingress and egress pipe 17 opening through the lower side wall of the tank. This tank is charged with a chemical water softening agent, such as granular Zeolite, to a level generally indicated at 18. The upper ends of both tanks have arcuate-shaped large-bore conduits 19 and 20 opening through their side walls and having unrestricted outlets 21 and 22 disposed slightly below their sealed upper end walls.

Figure 5:
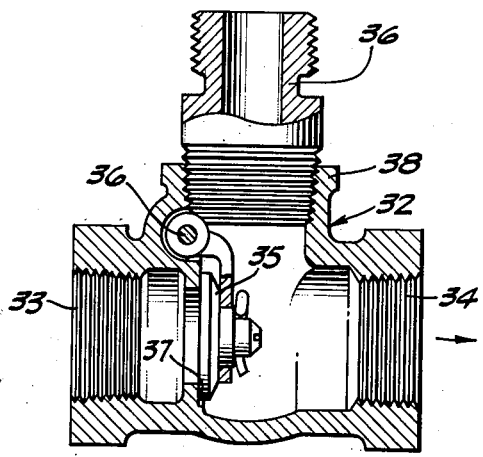
FIGURE 5 is a sectional view through the check valve used to permit withdrawal of sweet water during brine flow without danger of brine reaching the potable water.

The various pipe connections include a pressurized hard water supply conduit 25 opening through a nipple 26 in the vertical side wall of the automatic pressure-responsive valve housing 27. In normal service the hard water flows upwardly through the mid-portion of this housing and laterally through a connection 28 into inlet conduit 19 inside the softening tank 13. The water discharging from this conduit flows downwardly through the softening agent into perforated conduit 17 and outwardly to the soft water service faucets, not shown, through conduits 29, 30 and 31. Separating conduits 30 and 31 is a check valve 32 shown in detail in FIGURE 5 oriented in the same manner as in FIGURE 1. That is to say, conduit 30 is connected to the inlet end 33 of the check valve, while conduit 31 is connected to the outlet end 34. A simple gravity-actuated check valve 35 is pivotally supported on pivot pin 36 interiorly of the valve housing. It will therefore be evident that under no-flow conditions valve 35 is gravity seated against seating ring 37. A vertical outlet 38 is connected with a large-bore fitting 39 leading to other parts of the system and will be described presently. The remaining conduits shown in FIGURE 1 are closed during the normal service operation of the system and no flow takes place through them.

Attention is now invited to FIGURE 3 showing the constructional details of the pressure-responsive valve generally designated 27. It will be recalled that this valve has a hard water inlet 26 opening through its right-hand side wall and a water outlet 28 opening into the upper end of the softening agent tank 15. Its lowermost end has dual outlets 40 and 41, the latter being of somewhat greater capacity than the vertically disposed outlet 40. Conduit 42 connects outlet 40 to a T 43 interposed between the soft or sweet water distributing conduits 29 and 30, while outlet 41 connects into a fairly large bore pipe 44 leading to nipple 39 of check valve 32.

The hard water inlet connection 26 of valve housing 27 has a small-bore pipe 45, 46 extending through the top side wall of brine tank 10 and terminating in a gooseneck 20 terminating in outlet 22 slightly below the top end wall of the tank. Normally there is no flow of fluid through pipes 45, 46 because the outlet from the bottom of the tank is normally closed and used only for brief intervals when it is desired to convey brine to tank 15. The outlet pipe 13 at the bottom of the brine tank opens into the lower end of conduit 51 leading upwardly to a normally closed solenoid-operated valve 52 having a connection 53 to restrictor 54 discharging into the leg of a T-fitting 55. Restrictor 54 has a small-bore metered orifice 56 of much smaller diameter than either the passages of T-fitting 55 or of the brine conduits 51, 53. The upright end of T-fitting 55 is connected between a second restrictor 57 and conduit 42. Restrictor 57 has a metered orifice 58 of approximately three times the capacity of brine orifice 56 and its upper inlet end is connected directly to outlet 40 of the pressure-responsive valves.

Leading from the upper end of pressure valve 27 is a drain or flushing outlet 60 opening into a second normally closed solenoid valve 62 controlling the flow of water to a point of waste disposal through a drain conduit 63.

The pressure-responsive valve constituting an important feature of the invention comprises an elongated upright casing 65 having stepped aligned bores on its interior ranging from small bore 66 at its lower end through a much larger bore 67, a still larger bore 68, and a threaded bore 69 at its upper end closed by a cap screw 69a. Firmly seated in bore 68 is a brass or the like sleeve 70 having grooves for O-rings 71, 71 near its opposite ends providing a liquid seal with the bore wall. A third O-ring 72 forms a seal between cap 69a and the upper end of the sleeve. The sleeve is provided with a large diameter outlet opening 73 near its lower end and a generally rectangular outlet opening 74 near its opposite end opening into the drain passage fitting 60.

Loosely mounted for free vertical reciprocation within the valve housing is a unitary plunger element generally designated 75. This element includes a stem 76 having pistons 77, 78 and 79. Pistons 78 and 79 are of equal diameter and have approximately 20 mils clearance with the interior side wall of sleeve 70. The larger-diameter lower piston 77 likewise has a clearance of approximately 20 mils with the interior wall of bore 67. It will be observed that the interior bore of the sleeve is somewhat smaller than bore 67.

Completing the movable valve element 75 is an axially extending tapered valve element 80 at the lower end of the main body having a groove 81 for an O-ring 82. Element 80 fits freely within bore 66 and acts as a pilot for centering the element within this bore, so that ring 82 seats against the upper end of the bore wall and forms a fluid-tight seal therewith as well as a resilient cushion or support for the valve in its lower operating position. As will be made clear presently, the moving element 75 has only two operating positions, one being the full line position shown in FIGURE 3, while the second is indicated in dotted-dash lines.

The timer mechanism for controlling the normally closed solenoid valves 52 and 62 comprises a continuously-driven timer motor 85 for rotating cam 86 one revolution each twenty-four, forty-eight, seventy-two or ninety-six hours as may be determined in advance depending upon the hardness of the water and the rate of consumption. Riding against the periphery of cam 86 is the roller for a microswitch 87 biased toward closed position. This switch is held open except when the roller is seated in notch 88 of the cam. This notch is so formed that switch 87 remains closed approximately one hour, or for the period required to recondition the softening agent under typical operating conditions.

A second electric timer motor 89 drives a pair of cam discs 90 and 91 mounted on a common drive shaft and operable to close brine switch 92 for approximately eight to fifteen minutes as well as a double throw switch 93 for timer motor 89. Switch 93 is a snap action switch which remains closed on either of its contacts until it is in position to shift to its other position. Each of the switches is connected with a roller riding on the periphery of its associated cam disc.

The various components of the timer are connected in circuit with a source of electrical energy by lead lines 96, 97 and 98 in the manner clearly shown in FIGURE 6. Normally, the position of the valves and switches is as indicated in FIGURE 6 with motor 85 energized but all other parts de-energized.

*Operation*

Let it be assumed that the system has been freshly charged with brine and with a suitable water softening agent such as Zeolite to the levels indicated at 11 and 18 in FIGURE 1, and that the system has been connected to the source of pressurized hard water supply by way of conduit 25. It will also be assumed that the outlet conduit 31 is connected to a water distributing system having normally closed faucets therealong. It is also to be understood that the solenoid valves 52 and 62 controlling the flow of brine through conduit 51 and the flow of drain water through conduit 63, respectively, are connected in circuit with the timing motors and switches illustrated in FIGURE 6 operable to close and open the valves in timed sequence and for different intervals of time. Although these switches may be operated manually, it is preferable to do so automatically for obvious reasons, thereby rendering the system completely automatic.

Normally, the connections and fluid circuits are as indicated by the arrows in FIGURE 1. Hard water enters through conduit 25, passes into pressure valve 27 through inlet 26, and flows upwardly and outwardly through outlet 28 and gooseneck 19, and outwardly through opening 21 into the top of the softening tank 15. The hard water then filters downwardly through the chemical softening agent, through gravel bed 16 and out through the perforated pipe 17 whenever a faucet in distribution line 31 is opened. It will, of course, be realized that a very considerable amount of soft water is constantly stored within tank 15 in readiness for use whenever the faucets are opened. The withdrawn soft water is replaced by an equal amount of untreated water containing the objectionable ions of the common water-hardening agents. These are removed by attachment to the Zeolite as the water filters downwardly therethrough. The fluids within the other circuit conduits of the system are in a quiescent state throughout the extended periods of normal service. Flow cannot take place through the drain outlet 60 of the main valve 27 because solenoid pipe 62 controlling the drain outlet is closed. Likewise, no flow can take place downwardly through the lower end of the valve because the resilient gasket 82 cooperates with the lower end of movable element 75 to prevent any flow through bore 66 and outlets 40 and 41 therefrom; nor can brine flow from the lower end of tank 10 because solenoid valve 52 is closed. For the same reason, no flow can take place through conduits 45 and 46 leading into the top of the brine tank.

After a protracted period of use, the effectiveness of the chemical softening agent will decrease and it will be desirable to recondition the same. The original condition of this agent may be restored by circulating a highly concentrated solution of salt brine therethrough and then flushing the salt from the system by the use of water from the common supply source. The regeneration of the agent is usually initiated at midnight or during the night sleeping hours by simultaneously opening solenoid valves 52 and 62; whereupon the water flows through the system as indicated by the arrows in FIGURE 2. This operation is controlled by the timer mechanism which operates as follows:

On the elapse of the predetermined time period of normal water softening agent as measured by the particular timing cam 86 of the main timer 85, the roller of switch 87 will fall into notch 88 closing the switch. This will energize drain solenoid 62 and supply current through lead 98 and the upper contact of switch 93 to start the auxiliary timer 89. Current will also pass through brine solenoid 52 and closed switch 92. A few moments after timer 89 starts, cam 91 will shift switch 93 to its lower contact without breaking the circuit to motor 89 which will remain energized through lead 97 by-passing main switch 87.

The opening of the drain valve 62 vents tank 15 to the atmosphere, causing a considerable pressure drop across upper piston 79 of the pressure-responsive valve 27. The water supply line pressure is thereupon effective to move valve member 75 upwardly. As piston 79 comes opposite drain port 74, piston 78 enters the lower end of sleeve 70 so that the main line pressure is now effective on the underside of this piston as well as on piston 79. In consequence, the movement of piston 79 above port 74 takes place without hesitation or flutter under the impetus of the water supply line pressure. The valve continues its upward movement until the inclined surface 83 of the lowermost piston 77 seats firmly against the corner 84 of sleeve 70. The flow now takes place upwardly through the Zeolite and outwardly from the tank through gooseneck 19, fitting 28, port 73 of the sleeve 70, and drain opening 74.

During the reconditioning of the chemical agent the water flows in through inlet opening 26, but is directed downwardly by piston 77 and leaves valve 27 through openings 40 and 41. Normally no flow takes place through outlet 41, since it is connected to the by-pass pipe 44 to the check valve 32 in the sweet or soft water distribution line 30, 31. The main flow takes place downwardly through outlet 40 and into metered orifice 58 in restrictor 57. The water then flows downwardly through the vertical passage of T-fitting 55 and merges with an accurately proportioned but materially smaller flow of concentrated brine emerging from metered orifice 56 in restrictor 54. The flow of brine through restrictor 54 is caused by the main line pressure applied to the top of brine tank 10 by way of connections 45, 46 and 20. These connections merely assure that the full pressure of the supply line is applied to the top of the tank and acts as a piston forcing the saturated brine solution having a salometer of approximately 60 downwardly through gravel 12, inlet pipe 13 and upwardly through conduit 51, valve 52 and into restrictor 54. Since substantially the same main line pressure is applied to the inlets of both orifices, it will be quite apparent that the resulting flows are accurately proportioned in accordance with the areas of these orifices. Accordingly, I am able to provide a reliable and heretofore unattainable uniform concentration of brine solution measuring approximately 30 salometer flowing into the bottom of softening tank 15. Such a strong concentration of salt enables me to obtain highly efficient and effective reconditioning of the agent in a much shorter period of time than heretofore possible. There are several contributing factors of importance. Among these is the fact that regeneration is carried out under pressure conditions within my sealed system. A particularly important reason is that the concentrated brine solution flowing upwardly through the particles of the softening agent provides partial flotation of the particles along with gentle agitation, both of which contribute considerably to the effectiveness of regeneration and the flushing of brine from the Zeolite during the latter phase of the cycle.

The eight to fifteen minutes required to convey the brine into tank 15 is accurately measured by the length of notch 94 in disc 90 of timer motor 89. At the end of this period, switch 92 is opened to de-energize and close brine solenoid 52 while the timer continues to run for the full 90-minute period required for cams 90 and 91 to rotate through one turn. This 90-minute period is selected to be appreciably longer than the time switch 87 is held closed by main timer 85. Motor 89 is, of course, de-energized instantly and automatically after one revolution of the cams, since the roller for switch 93 falls into notch 95 and breaks the circuit to the motor.

The flushing of the Zeolite continues until switch 87 opens, thereby de-energizing and closing drain solenoid 62. When this occurs, the pressure differential across piston 79 ceases due to the escape of water therearound. As a result, valve 75 returns to the full line position shown in FIGURE 3 fully restoring the normal operating conditions with fully regenerated Zeolite.

At this point it should be noted that should any one of the faucets in the water distributing line be opened while brine is flowing in pipe 29, there is absolutely no possibility of brine passing into line 31. This is because of check valve 32 and the relative sizes of conduit 44 and restrictors 54 and 57. Thus the capacity of pipe 44 is so large in relation to the water passed by the restrictors that there is always sufficient pressure on the right-hand side of the check valve to hold it closed. And, of course, the venting of tank 15 to the atmosphere through the drain is a contributing factor. Hence, it will be clear that sweet though hard water can be withdrawn even while brine is flowing through a part of the normal soft water distributing pipe.

While the particular method and apparatus herein shown and disclosed in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

I claim:

1. That method of treating a pressurized source of hard water to soften it by means of a closed system all portions of which are subject to the pressure of the water and having a chamber charged with a chemical softening agent and a separate chamber charged with a highly concentrated brine solution for reconditioning said softening agent, said method comprising normally flowing untreated water through the agent in one direction to soften the same and then to a point of use independently of said brine chamber for a period of time greater than twenty-four hours and terminating after midnight, thereupon initiating the reconditioning of said agent by venting the hard water inlet of said conditioning chamber to the atmosphere through an opening considerably smaller than the hard water supply stream, utilizing the pressure drop adjacent the interior side of said vent to effect a change in the flow of said hard water including the circulation of a first stream into the upper end of said brine solution chamber to displace a stream of brine solution therefrom and to merge the same with a second stream of hard water flowing through said softening agent in an opposite direction to the normal flow of water therethrough, discontinuing the pressurized displacement of brine after a brief interval while continuing the flow of said second stream through said agent and said vent for a period several times greater than said period of brine flow in order to flush brine and impurities from said softening agent chamber, and thereafter discontinuing the venting of water to the atmosphere to equalize pressure conditions interiorly of said closed system and thereby automatically restoring said normal flow of untreated water through the reconditioned softening agent.

2. That method of treating a pressurized source of hard water as defined in claim 1 which includes proportioning the flow of brine solution and of said second stream of water substantially in the ratio one to three in favor of the water flow.

3. A hard-water softening system of the closed pressurized type having a brine solution chamber connected in multi-passage valve-controlled circuit with a chemical softening agent tank having its upper end normally connected directly to a source of hard water and maintained under the pressure of said hard water source, including a first normally closed solenoid valve located directly in a drain pipe connected to the top of said tank and leading to a point of waste disposal at atmospheric pressure, a second normally closed solenoid valve controlling the flow of brine solution from said brine chamber to the bottom of said softening tank, a pressure-responsive valve in the hard water supply conduit having one portion exposed to the low pressure existing in said drain pipe when said first solenoid valve is open and having another portion exposed to the appreciably higher pressure of said hard water source and operable by this difference in pressure to reverse the flow of water through said softening tank and to maintain this reverse flow so long as said first solenoid valve remains open, and timer-driven means for energizing said solenoid valves for different time intervals including first timer means for measuring a long interval and second timer means for measuring a short interval accurately, means controlled by said first timer to activate said drain solenoid valve and the second timer means, said second timer including means actuated thereby for energizing said brine solution solenoid valve for a short period, and the first timer means thereafter closing said drain solenoid following an interval materially greater than the period the solution valve was open.

References Cited in the file of this patent

UNITED STATES PATENTS

| 2,545,425 | Fischer | Mar. 13, 1951 |
| 2,670,328 | Webb | Feb. 23, 1954 |
| 2,744,867 | Webb | May 8, 1956 |
| 2,751,347 | Miller | June 19, 1956 |

OTHER REFERENCES

Nordell: "Water Treatment," New York, Reinhold, 1951, pp. 347, 348, 359. Library.